United States Patent [19]

Li et al.

[11] Patent Number: 4,674,002

[45] Date of Patent: Jun. 16, 1987

[54] DIRECTIONAL COMPARISON BLOCKING SYSTEM

[75] Inventors: Hung J. Li, Coral Springs, Fla.; John D. McFall, Auburn Township, Geauga County, Ohio

[73] Assignee: Westinghouse Electric Corp., Pittsburgh, Pa.

[21] Appl. No.: 849,245

[22] Filed: Apr. 8, 1986

[51] Int. Cl.$^4$ ............................................. H02H 3/30
[52] U.S. Cl. ........................................ 361/66; 361/42; 361/69; 361/77; 361/94
[58] Field of Search ................... 361/42, 62, 64, 66, 361/68, 69, 77, 81, 82, 83, 84, 85, 93, 94

[56] References Cited

U.S. PATENT DOCUMENTS

| | | | |
|---|---|---|---|
| 4,371,908 | 2/1983 | Andow et al. | 361/84 X |
| 4,470,093 | 9/1984 | Yamaura | 361/68 |
| 4,528,611 | 7/1985 | Udren | 361/82 X |

*Primary Examiner*—A. D. Pellinen
*Assistant Examiner*—Derek S. Jennings
*Attorney, Agent, or Firm*—W. E. Zitelli

[57] ABSTRACT

An echo-keyed directional comparison blocking system for protecting an electrical power transmission path in a power system network against internal faults is disclosed. The system includes a terminal unit disposed at each end of the transmission path for measuring characteristics representative of the power at its corresponding end and for activating a corresponding circuit breaker when an internal fault of the transmission path is detected. Each terminal unit includes a transmitter and a receiver for communicating transmit and receive signals with each other through a communication medium and additionally includes at least one forward-looking pilot relay, at least one over-current relay, and a plurality of circuits. The aforementioned combination provides for internal fault preference over an external fault, speeds up tripping of the circuit breakers under the conditions of one relay responding slower to a fault detection than another, eliminates problems which may delay circuit breaker activation caused by electrical noise coupled to the receiver, and improves transient block and unblock responses to fault conditions of the power system network.

18 Claims, 3 Drawing Figures

DIRECTIONAL COMPARISON BLOCKING SYSTEM

BACKGROUND OF THE INVENTION

The present invention relates to protective relays in general, and more specifically to an improved echo keyed directional comparison blocking system for protecting an electrical power transmission path against internal faults.

Conventional directional comparison blocking systems generally include at each end of the protected transmission path a directional pilot forward-looking relay, a directional pilot reverse-looking relay, an auxiliary logic block and a pilot communication link including a transmitter and receiver for exchanging information representative of the measured power flow conditions at the two ends of the transmission path. The directional pilot forward-looking relays have as their forward zone at least the distance of the transmission path while the reverse pilot relays look in the opposite direction. Generally, the directional pilot forward-looking relays detect a fault condition and the reverse-looking relays determine if that fault condition is within the transmission path. If the fault is determined to be outside of the transmission path, commonly referred to as an external fault, the auxiliary logic block keys the generation of a blocking carrier signal which is exchanged over the communication link between the logic units at the two ends of the transmission path to prevent interruption of current through the transmission path being protected. Otherwise, with an internal fault detection, the current through the transmission path is caused to be interrupted.

An echo key concept to directional comparison blocking relay systems has been proposed in the U.S. Pat. No. 4,484,245 issued to John D. McFall on Nov. 20, 1984 and assigned to the same assignee as the instant application. Among other improvements, this new system eliminates the need for the reverse-looking pilot relays at the two ends of the transmission path being protected and relies solely on the directional pilot forward-looking relays for measurement information. For example, when the directional pilot forward-looking relay at one end of the transmission path detects a fault condition, it causes the logic block to key its transmitter unit to transmit an initial carrier signal for a short time interval over the communication link to the receiver and logic unit at the other end of the transmission path. If the detected fault is external to the transmission path, the carrier signal is echo-keyed by the logic unit at the other end of the transmission path back to the initiating logic unit to act as a blocking signal to prevent interruption of current through the transmission path. The carrier signal communication between the logic units at the two ends of the transmission path is locked in for a predetermined period of time so long as the previously described condition prevails. Of course, should the condition change to reflect an internal fault, then the carrier blocking signal is inhibited to permit current interruption through the transmission path.

In theory, the McFall echo key system appears to be quite adequate in carrying out its functional requirements, but is not without improvement especially under special conditions of practical operation in a power system network. For example, for those protective systems which provide voice service over the same communication link as used for the blocking carrier signal, the carrier receivers may interrupt the voice signalling as a blocking signal and inhibit current interruption during the time the voice channel is operative. Accordingly, the circuit breakers isolating the transmission path may be delayed in operation if the voice channel is being used at the inception of an internal fault. Another example is where the directional pilot forward-looking relays do not operate together upon an internal fault, but rather one is substantially slower in operation than the other. Because of the logic design of the echo key system, the difference in operating speeds of the two relays may cause an undesirable delay in current interruption in response to the detection of an internal fault.

A still further example of an improvement area is where electrical noise may be coupled into the communication channel. Any noise from the channel will echo key the transmitter via the logic block and this keying will be sealed in for a considerable time period. Accordingly, during this seal-in period, the logic unit is blocked from responding to an internal fault condition and thus tripping of the circuit breaker units will be unduly delayed. In addition, McFall's proposed system does not provide full transient blocking to prevent false operation on all conditions of external faults. For example, where there exists a parallel transmission path to the protected path, both being provided electrical energy from sources at their common ends, the McFall system may render a false trip of the protected transmission path upon detection of a power reversal condition brought on by the sequential closure of the circuit breaker units of the parallel path caused by an internal fault thereon.

Applicants' invention as disclosed hereinbelow offers features which include improvements covering the above exemplary cases as well as other improvements. The disclosed embodiment provides for a viable directional comparison blocking system suitable for application in a power system network environment which may give rise to the aforementioned difficulties.

SUMMARY OF THE INVENTION

An echo-keyed directional comparison blocking system protects an electrical power transmission path against internal faults. The transmission path includes means for interrupting current at each end thereof. The system includes a terminal unit disposed at each end of the transmission path for measuring characteristics representative of the power at its corresponding end of the path and for activating its corresponding interrupting means when an internal fault of the transmission path is detected. Each terminal unit includes a transmitter, and a receiver for communicating transmit and receive signals with each other through a communication medium. Each receiver is adapted to receive signals from the transmitter of the terminal units over the communication medium.

In accordance with the present invention, each terminal unit comprises at least one forward-looking pilot relay, at least one overcurrent relay, and first through fourth circuits. The forward-looking pilot relay is coupled to the transmission path at its corresponding end and has its forward zone at least the length of the transmission path. The pilot relay is operative to generate a first fault signal when it detects a fault within its forward zone. The overcurrent relay is coupled to the transmission path at its corresponding end for measuring the current of the path at such end and has a preset overcurrent threshold. The overcurrent relay is operative to generate a second fault signal when the measured current exceeds the preset threshold.

The first circuit of each terminal unit is governed by both the first and second fault signals of its corresponding pilot and overcurrent relays to supervise the fault detection of the transmission path and to generate a first signal representative of such fault detection. The second circuit is governed by the first signal to key the corresponding transmitter for reception time interval to transmit an initial signal to the other terminal unit over the communication medium. The third circuit is responsive to a receive signal from the other terminal unit to key the transmitter to transmit an echo signal to the other terminal unit over the communication medium. The fourth circuit is governed by the first signal sustained beyond the reception time interval to generate a signal for operating the interrupting means, such generation being blocked in response to a received signal.

In an alternate embodiment, each terminal unit may include another circuit governed by a fault signal sustained beyond the reception time interval and a receive signal which has not been echo-keyed to inhibit the transmitter from transmitting a signal over the communication medium. And still another embodiment, each terminal unit may include another circuit governed by a fault signal to supervise the conduction of a receive signal from the receiver to other specified circuits of its terminal unit.

DESCRIPTION OF THE PREFERRED EMBODIMENT

Figure 1:
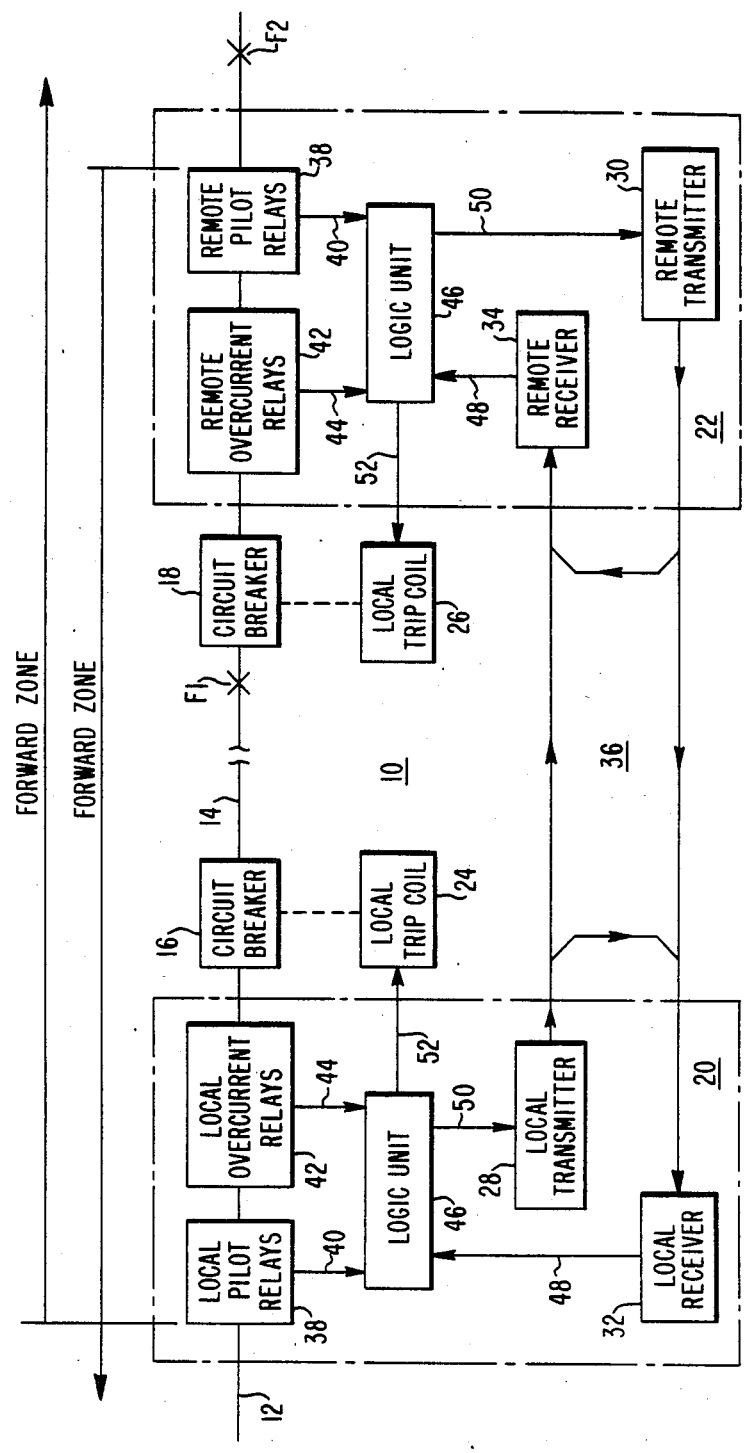
FIG. 1 is a block diagram schematic illustration of an echo-keyed directional comparison blocking system suitable for embodying the principals of the present invention.

In FIG. 1 there is shown in a block diagram schematic illustration an echo-keyed directional comparison blocking system 10 coupled to a transmission line 12 for protecting the transmission path 14 shown between the conventional breaker units 16 and 18. One terminal unit 20 is disposed at one end or the local end of the transmission path 14 and another terminal unit 22 is disposed at the other end or the remote end thereof. Each terminal unit 20 and 22 measures the characteristics representative of the power flow of its corresponding end of the transmission path 14 and is operative to activate its corresponding breaker units 16 and 18 through local and remote trip coils 24 and 26, respectively. The circuit breaker units 16 and 18, when activated, interrupt the current through the transmission path 14. The terminal units 20 and 22 are designed for detecting an internal fault like that shown at F1 in the transmission path 14 and activate the breaker units 16 and 18 via the trip coils 24 and 26, respectively. The local and remote terminal units 20 and 22 include corresponding transmitters 28 and 30 and receivers 32 and 34, respectively. Each transmitter 28 and 30 is capable of transmitting a carrier signal through a communication medium 36 to the receivers 32 and 34. Accordingly, each receiver 32 and 34 is adapted to receive carrier signals from the transmitter of the terminal units 20 and 22 over the communications medium 36.

Each terminal unit 20 and 22 includes at least one directional pilot forward-looking relay shown at 38 coupled to its corresponding local and remote end of the transmission path 14. Each directional pilot relay 38 has its forward zone at least the length of the transmission path 14. The directional pilot relays 38 are operative to generate a fault signal 40 in each case when it detects a fault within its forward zone. Note that in the present embodiment, the forward zones of the pilot relays 38 extend beyond the transmission path 14 being protected by the circuit breakers 16 and 18.

The local and remote terminal units 20 and 22 each include at least one overcurrent relay 42 coupled to its respective end of the transmission path 14 for measuring the current at its corresponding end. Each overcurrent relay 42 has a preset overcurrent threshold such that when the measured current exceeds the preset threshold, the relay 42 operates to generate an overcurrent fault signal 44 in each case. Each terminal unit 20 and 22 further includes a logic unit 46 which uses the fault signals 40 and 44 and a received signal 48 from its corresponding receiver to decide whether or not to key its corresponding transmitter using the signal 50 in each case and whether or not to operate the corresponding trip coil 24 or 26 using the signal line 52 in each case. The logic unit 46 includes combinational logic such as that shown in the block diagram schematic of FIG. 2 which will be described in greater detail hereinbelow.

The overcurrent relays 42 may include relays for measuring the current of one or more of the transmission line phases, like Ia and Ic and may further include a relay for measuring the zero sequence current Io, for example. In the present embodiments, the preset overcurrent threshold may be set higher than the maximum load current of the transmission path and lower than the minimum fault current thereof. The combination of overcurrent relays may be "OR"ed together to effect the fault signal 44. In addition, the pilot relays 38 may include one or more phase pilot relays and a ground pilot relay, denoted as 21P and 21NP, respectively, in FIG. 2. The fault signals effected from the 21P and 21NP relays are denoted as 40a and 40b in FIG. 2.

Figure 2:
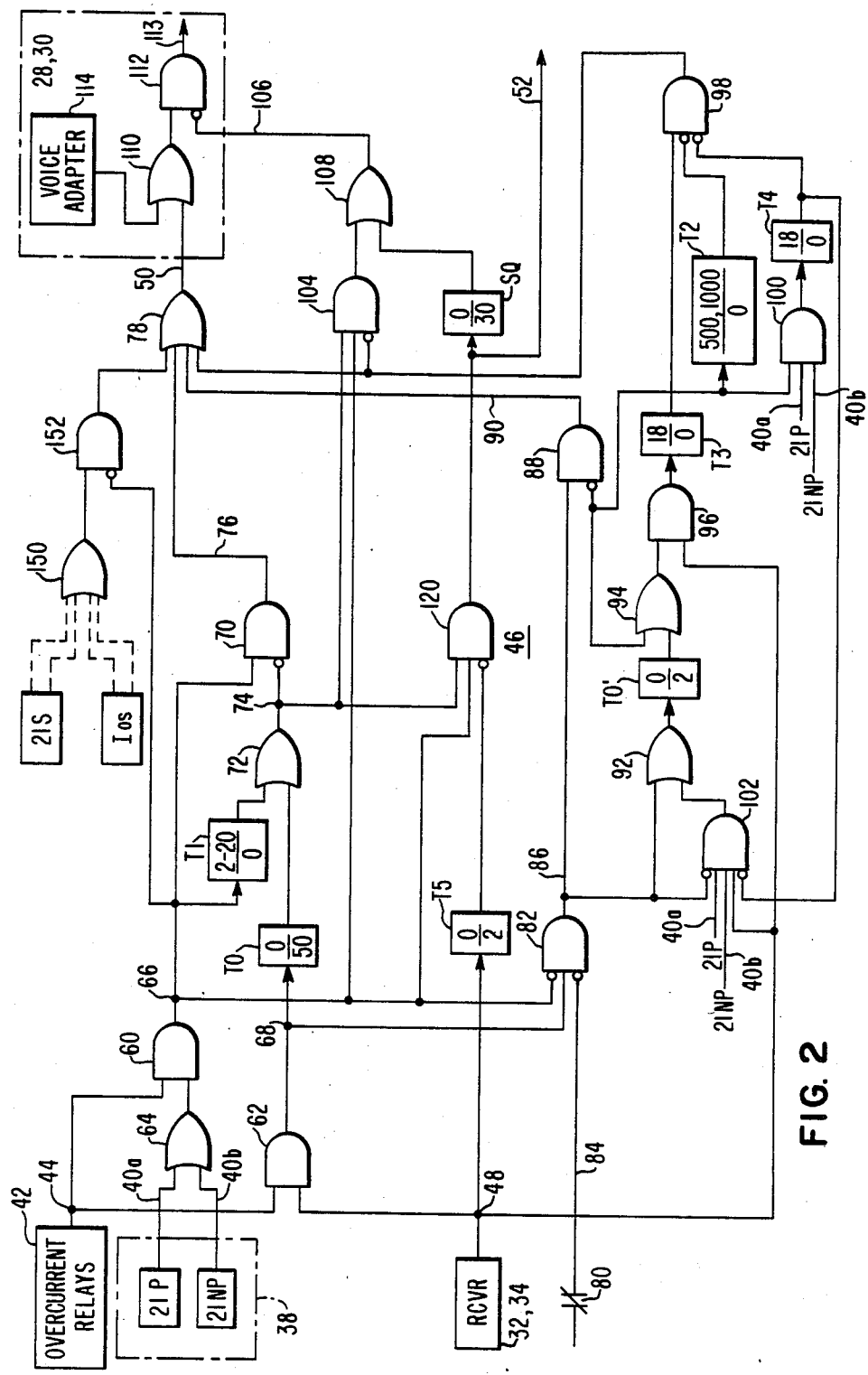
FIG. 2 is a circuit schematic diagram of a terminal unit suitable for embodying in the system depicted in FIG. 1.

FIG. 2 is a block diagram schematic exemplifying the combinational logic included in the logic unit 46. Referring to FIG. 2, the fault signal 44 from the over-current relays 42 is coupled to one input of an AND gate 60 and, in addition, is coupled to one input of another AND gate 62. The fault signals 40a and 40b from the directional pilot relays 38 are coupled to an OR gate 64 having its output coupled to the other input of the AND gate 60 which operates to supervise the fault detection of the transmission path and to generate a signal 66 which is representative of the supervised fault detection.

A received signal line 48 of receiver 32, 34 is coupled to the other input of the AND gate 62 which operates to supervise the conduction of the received signal to other specified circuits. More specifically, if the fault signal 44 is present, the AND gate 62 effects a supervised received signal over signal line 68 which is coupled to a timer T0. In the present embodiment, the timer circuits designated by a T followed by a reference numeral may either delay the leading edge or the falling edge of a signal or both. Inside the timer block is shown one number above another number separated by a line. The top number refers to a suitable setting for the time delay in milliseconds of the leading edge of the input signal and the bottom number represents a suitable delay in milliseconds for the falling edge of the input signal. For example, the timer circuit T0 is set for zero milliseconds leading edge delay and 50 milliseconds falling edge delay. This designation will be used for all of the timer circuits as shown in FIG. 2.

The signal line 66 is coupled to one input of another AND gate 70 and also to the input of a timer circuit T1. The outputs of the timer circuits T0 and T1 are coupled to inputs of an OR gate 72, the output 74 thereof being coupled to an inverting input of the AND gate 70. In this configuration, the AND gate 70 generates a keying signal for a reception time interval over signal line 76 as governed by the signal 66, i.e. until either the timer T1 times out or a supervised signal 68 is generated. The delay of timer T1 is set slightly beyond the transmission delay time. Thus, the signal 76 keys the transmitter 28, 30 via an OR gate 78 and keying signal 50 for the reception time interval which in the present embodiment may be selected between 2 and 20 milliseconds or until a signal is received by the receiver 32, 34.

Each logic unit 46 monitors the status of its corresponding breaker 16 or 18. In the present embodiment, a relay contact like that shown at 80 is used for this purpose, the status of which being coupled to an inverting input of an AND gate 82 over signal line 84. Inverting and non-inverting inputs of the AND gate 82 are coupled to the supervised fault and received signal 66 and 68, respectively. The AND gate 82 is responsive to the status of its input signals to generate a signal over signal line 86 which is gated through another AND gate 88 having its output signal over line 90 conducted to the OR gate 78 to key the transmitter 28, 30 using the keying signal line 50. In addition, the signal 86 is coupled to another OR gate 92 which has its output coupled through a timer T0' having a 2 ms falling edge delay to another OR gate 94.

An AND gate 96 has coupled to its inputs the output of the OR gate 94 and the signal line 48 from the receiver 32, 34 and has its output coupled through another timer circuit T3 to an inverting input of the AND gate 88 and a non-inverting input of an AND gate 98. Moreover, the output of timer T3 is coupled to an inverting input of the AND gate 98 through another timer circuit T2 and further coupled to one input of another AND gate 100. Other inputs of the AND gate 100 are coupled to both fault signals over signal lines 40a and 40b. The AND gate 100 is coupled to an inverting input of the AND gate 98 through the timer unit T4 which also has its output coupled to an inverting input of another AND gate 102. Non-inverting inputs of the AND gate 102 are coupled to the fault signal lines 40a and 40b and also to the received signal line 48. The signal line 86 is coupled to an inverting input of the AND gate 102 which has its output coupled to another input of the OR gate 92.

An AND gate 104 has coupled to its non-inverting inputs the signals 66 and 74 and has coupled to its inverting input the output of the AND gate 98 which is also coupled to another input of the OR gate 78. Governed by the status of its input signals, the AND gate 104 is operative to inhibit the transmitter 28, 30 from transmitting a signal over the communications medium by generating an inhibiting signal 106 via an OR gate 108.

The transmitter 28, 30 is shown functionally in the schematic of FIG. 2 with an OR gate 110 coupled to an AND gate 112, the output 113 of which being the governing signal for the signal transmission. As exemplified in FIG. 2, the transmission keying may either come from the logic unit 46 or from a conventional voice adapter unit 114 utilizing the inputs of the OR gate 110. In addition, the transmitter keying may be inhibited by the signal 106 utilizing the inverting input of the AND gate 112 which is disabled from passing the keying signal from the OR gate 110 to the transmitting portion of the transmitter 28, 30.

Finally, the logic unit includes an AND gate 120 for generating the tripping signal 52 according to the status of its inputs which include two non-inverting ones from the signal lines 74 and 66 and another inverting one from the receiver line 48. Disposed between the receiver and the inverting input to AND gate 120 is a timer T5 which may be set for a 2 ms delay on the falling edge of the receive signal. The added timer T5 will sustain the receive signal for 2 ms after the receiver output ceases. Thus, any interruption of carrier, such as a nose spike, for example, will not enable AND gate 120 and cause a breaker trip.

Further, in the present embodiment, the tripping signal 52 is also used to inhibit the transmitter 28, 30 from transmitting via the OR gate 108 and signal line 106. Coupled between the AND gate 120 and OR gate 108 is a squelch timer SQ which offers a delay to the falling edge of the tripping signal to maintain the disabling state of the transmitter 28, 30. For the present embodiment, the delay of SQ is set at around 30 milliseconds.

With the inclusion of the supervising gate 62, any electrical noise coupled to the receiver lines will not trigger an echo-keyed locked in blocking condition for inhibiting or delaying the trip signal generation. It is only when the fault signal 44 is generated along with the received signal will an echo-keyed signal be generated via AND gates 82 and 88 and OR gate 78.

The following operational examples will be described in connection with both FIGS. 1 and 2. For an internal fault, such as that shown at F1 on the transmission path 14, both of the local and remote distance relays 38 operate to generate their respective fault signals 40. In addition, the local and remote pilot relays 42 operate to generate their respective fault signals 44. Under these conditions, the AND gate 60 generates its signal over signal line 66 to the AND gate 70 which, in turn, generates the keying signal 50 via signal 76 through the OR gate 78. Both the local 28 and remote 30 transmitters transmit their initial signal to the other receivers 34 and 32, respectively. Upon reception, the signal is supervised by the fault signal 44 and conducted through the AND gate 62 to both the OR gate 72 and AND gate 82. Since the supervised fault signal 66 is generated, the AND gate 82 is disabled from echo keying its received signal and, in addition, the initial keyed transmission signal is blocked by either the reception signal at OR gate 72 or the timing out of the timer T1. Either of these two events disable the AND gate 70 from further keying the transmitter. Under the condition of neither transmitter 28 nor 30 transmitting, the received signal is lost and the AND gate 120 is enabled via signal line 48 as a result thereof. With the AND gate 120 enabled, the input signals 66 and 74 thereof logically cause its output signal 52 to be generated for tripping the corresponding breaker units 16 and 18. With the above-described configuration, the speed of trip is enhanced over that of the McFall system disclosed in U.S. Pat. No. 4,484,245.

In the case in which there exists an external fault within the forward zone of the directional pilot relays 38 of the local terminal 20, for example, such as that shown at F2 in the illustration of FIG. 1, the relay units 38 and 42 of the local terminal 20 both generate their respective fault signals to key the local transmitter unit 28 via the logic gates 60, 70, and 78. When the initially keyed transmission signal is received by the remote receiver 34, it is gated through the AND gate 62 to the AND gate 82 because the remote overcurrent relays 42 detect the external fault at F2 and generate the fault signal 44 which effects the gating of the AND gate 62. However, since the external fault F2 is outside of the forward zone of the remote distance relays 38, no fault signals 40 are generated thereby and thus the supervised signal 66 is not present under these conditions. As a result, the initially transmitted signal from the local terminal 20 is echo-keyed back to the local receiver 32 via control of the AND gates 82 and 88 and OR gate 78. In response to the received echo-keyed signal the local logic unit 46 blocks the trip signal generating AND gate 120 and prevents the local unit 20 from tripping on external faults. Note that the local terminal 20 is disabled from keying its transmitter 28 by its signal 66, thus will not echo.

At the remote terminal 22, should the keying conditions continue beyond the delay time set for timer T3, which in the present embodiment is 18 milliseconds, then the AND gate 88 is disabled but the output of the timer T3 is locked in place via the feedback line to OR gate 94 which controls the input to AND gate 96. With the T3 output locked in, the AND gate 98 maintains the echo keying of the blocking signal through the OR gate 78. Under these conditions, the terminals 20 and 22 are blocked from operating their respective circuit breakers 16 and 18 and interrupting current from the transmission path 14. The terminal units 20 and 22 utilize the timer T2 for releasing itself from this blocking condition. The timer T2 delays the disabling of the AND gate 98 from the time of signal generation from the timer T3. In the present embodiment the delay time may be selected between say 500 and 1,000 milliseconds, for example.

The next operational example will be that of the transient blocking situation and will be described in connection with the illustration of FIG. 3 which depicts a parallel transmission path 130 with that of the transmission path 14 and electrical generating sources S1 and S2 for providing power to the local and remote ends of the parallel paths. The parallel line also includes circuit breakers 132 and 134 disposed at its local and remote ends, respectively. In accordance with the following explanation, it is assumed that an external fault shown at F3 occurs on the parallel line 130 near breaker 134, and for some applications is within the forward zone of both local and remote pilot relays 38 of the terminal units 20 and 22.

Accordingly, when the external fault F3 occurs, the local pilot relays 38 at the local end are operated to generate the corresponding fault signal 40. Power direction contemporaneous with external fault occurrence is shown by the solid arrow 136. Now, should the breaker unit 134 be activated substantially in time before the breaker unit 132 because of the difference in tripping response times thereof, a power direction reversal results in the transmission path 14 which is illustrated by the dashed line 138. This transient shift in power direction causes the remote pilot relays 38 of the terminal 22 to operate and causes the local pilot relays 38 of the terminal 20 to deactivate. However, a false tripping situation may occur if the remote pilot relays have a substantially faster response to the power flow reversal than the local pilot relays. In which case, both sets of relays concurrently generate their fault signals 40. To prevent this false tripping situation, transient blocking logic has been embodied in the logic units 46 as shown in FIG. 2.

For the forward external fault condition, the fault signal 40a or 40b is generated and a carrier signal is received over signal line 48. In response, AND gate 102 initiates a blocking signal via OR gate 92 and OR gate 94 immediately after the external faults inception. The transient block timer T3 times out and seals in its own output via OR gate 94. The transient blocking signal is keyed to the transmitter through AND gate 98 and OR gate 78. The forward transient blocking condition is released upon the loss of receiver signal over signal line 48, i.e. after T3 produces an output, the carrier of the transmitter 28, 30 is keyed by T2 via AND gate 98 and OR gate 78, which keying is inhibited 18 ms after carrier transmission commences by the disabling action of AND gate 100 and timer T4 on AND gate 98, or the timing out of the reset time T2. If the parallel line provides for a reclosing scheme, the reset timer T2 may be set at 1,000 millisecond delay, for example. Otherwise, the timer T2 may be set at around 500 milliseconds. The T2 timing logic also provides blocking signal continuation to increase the security of the system and prevent false tripping if the pilot relay is slow to reset on an external fault.

For the reverse external fault case, the operation of the transient blocking logic is similar to that just described for the forward external fault condition, except that OR gate 92 is governed by the output signal 86 from AND gate 82 instead of the signal generated from AND gate 102.

Should an internal fault occur on the protected transmission path 14 such as that shown at F1, for example, during transient blocking, tripping of the circuit breakers 16 and 18 may be delayed. To prevent this delay, the logic unit embodiment of FIG. 2 includes a transient unblocking feature comprising AND gate 100 and timer T4. During the transient blocking condition, the output of timer T3 enables the AND gate 100 to respond to the internal fault signal 40a and 40b and generate a disabling signal to the AND gate 98 delayed by the timer T4 which in the present embodiment is set at about 18 milliseconds. When the AND gate 98 is disabled, the transmitters at both terminal units 20 and 22 stop their transmissions which unblock the AND gates 120 permitting circuit breaker operation for the protected line 14. In effect, the transient unblocking circuitry allows for a slight delay of 18 milliseconds or so for tripping on internal faults when both local and remote pilot relays operate after the transient blocking condition has been set up. Note that the output signal of timer T4 also disables AND gate 102 from responding to a forward external transient blocking situation.

In summary, for the forward external fault condition (F2), the local transmitter 28 is keyed for the time internal of T1. The keyed carrier of the local transmitter 28 is conducted to the remote unit 22 to key the remote transmitter 30. After T3 of the local unit 20 times out and produces an output, the local transmitter 28 is locked in a keyed state for generating its carrier signal, but may be released when AND gate 100 is activated and in response T4 times out to disable AND gate 98. Keep in mind that the remote transmitter 30 continues to generate its carrier. With the system in this state, if an internal fault F1 occurs, the remote transmitter 30 is disabled by the transient unblocking feature of AND gate 100 and time T4 after an 18 ms delay.

The squelch timer SQ embodied in the logic unit 46 functions to maintain transmission inhibition for a predetermined time after the trip signal 52 is removed. In the present embodiment, the time delay is on the order of 30 milliseconds and acts through the OR gate 108 to disable the functional AND gate 112 in the transmitter 28, 30.

Figure 3:
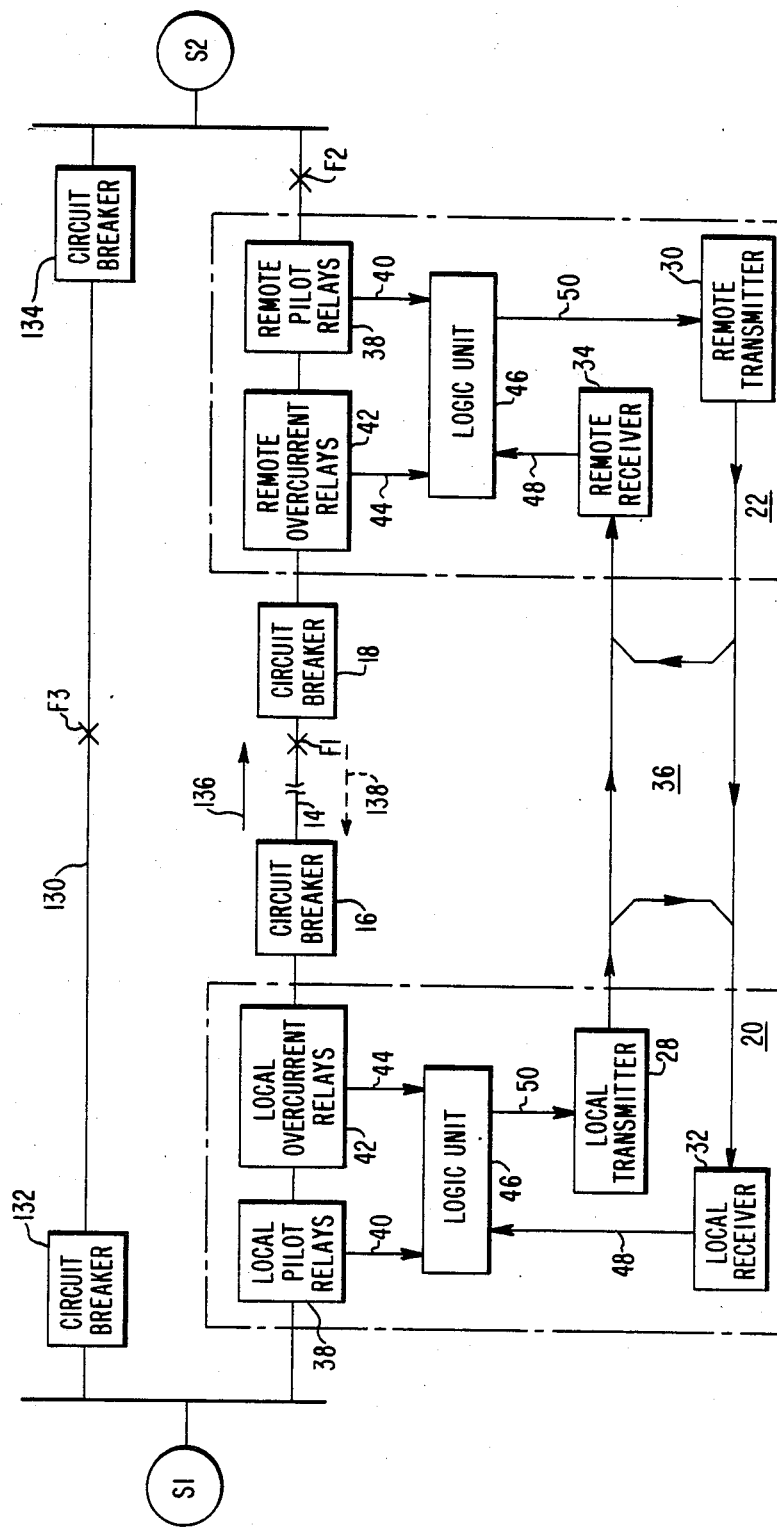
FIG. 3 is a block diagram schematic of an echo-keyed directional comparison blocking system used for illustrating an operational aspect of the present invention.

Another operational example is where one of the two sources say, S2 as shown in FIG. 3, is a weak source, that is, has a high internal impedance. Under weak source conditions, some precautions should be taken because the weak source pilot relays may not detect an internal fault and key back an echo blocking signal to prevent the system 10 from interrupting current through the protected transmission path 14. The present embodiment compensates for the weak source case by including overcurrent relays 42 at both the local and remote terminals and sets the threshold limit of the overcurrent units higher than the maximum load current of the transmission path 14 but lower than the minimum forward external fault current expected. Thus, should an external fault occur like that shown at F2, for example, which is forward to the strong source terminal 20, the pilot relays thereof detects the fault and keys the initial transmission signal to the remote terminal 22. Concurrently, the pilot relays at the remote terminal 22 do not react to the external fault F2, but the overcurrent relays thereof do. Consequently, the overcurrent fault signal 44 enables the AND gate 62 to pass the received initial signal to the AND gate 82 which initiates the echo-keying for the system 10 to block the tripping of the circuit breakers 16 and 18.

With an internal fault F1, the pilot relays of the strong source terminal 20 will operate the same as that described for the external fault F2, but the overcurrent units at the weak source terminal 22 do not operate because of the threshold setting thereof. Accordingly, AND gate 62 is not enabled thus preventing AND gate 82 from initiating the echo-keyed blocking signal to the strong source terminal and thus, permitting the strong source terminal 20 to trip its corresponding circuit breaker 16.

Another exemplary operational case involves internal fault preference so that the voice adapter unit 114 may utilize the common communication link between the local and remote terminals 20 and 22. For example, if the voice adapter 114 is applied to the blocking system 10, the receivers 32 and 34 at both local and remote terminals receive the voice signal and may block the tripping paths in the logic, as described hereinabove, during the time the voice channel is operated. In the present embodiment, as shown in the circuit schematic of FIG. 2, the AND gate 104 is included in the logic unit 46 to provide an internal fault preference making it possible for the system 10 to trip on an internal fault when the voice circuit is in operation. In essence, the AND gate 104 is governed by its input signals to preempt the voice channel and inhibit transmission by disabling governing AND gate 112 via OR gate 108.

Finally, the present embodiment is designed to operate under the conditions where the transmission path 14 is protected at one terminal with an echo key scheme, but at the other terminal is a conventional scheme including reverse distance relays generating fault signals denoted in FIG. 2 for phase, as 21S, and for ground, as Ios. If not compensated for, the conventional terminal may false trip on an external fault which is behind the echo key terminal, because there is no blocking signal initiated from either terminal. To adjust for this, an OR gate 150 may be disposed in the logic unit 46 and be coupled to the fault signals from the reverse distance relays 21S and Ios. In addition, an AND gate 152 may be disposed between OR gates 150 and 78. A non-inverting input of gate 152 may be coupled to the output of OR gate 150 and the output of gate 152 may be coupled to an input of OR gate 78. An inverting input of AND gate 152 is coupled to signal 66. With this configuration, the OR gate 150 may key a transmission blocking signal via AND gate 152 and OR gate 78 to block the other terminal from tripping in this mixed system application. The AND gate 152 makes certain that the outputs of the pilot and overcurrent relays (signal 66) have preference over the signals 21S and Ios to ensure tripping of the breakers for an internal fault.

While the present invention has been described hereinabove in connection with a specific embodiment, it is understood that it should not be limited as such to the described embodiment, but rather construed in both breadth and scope in accordance with the appended claims.

What is claimed is:

1. An echo-keyed directional comparison blocking system protecting an electrical power transmission path against internal faults, said transmission path including means for interrupting current at each end thereof, said system including a terminal unit disposed at each end of said transmission path for measuring characteristics representative of the power at its corresponding end of said path and for activating its corresponding interrupting means when an internal fault of the transmission path is detected, each terminal unit including a transmitter, and a receiver for communicating transmit and receive signals with each other through a communication medium, each receiver adapted to receive signals from the transmitters of the terminal units over said communication medium, each terminal unit comprising:

at least one forward-looking pilot relay coupled to said transmission path at its corresponding end and having its forward zone at least the length of said transmission path, said pilot relay operative to generate a first fault signal when it detects a fault within its forward zone;

at least one overcurrent relay coupled to said transmission path at its corresponding end for measuring the current of said path at its corresponding end and having a preset overcurrent threshold, said overcurrent relay operative to generate a second fault signal when said measured current exceeds said preset overcurrent threshold;

first circuit means governed by both of said first and second fault signals to supervise the fault detection of said transmission path and to generate a first signal representative of said supervised fault detection;

second circuit means governed by said first signal to key said transmitter for a reception time interval to transmit an initial signal to said other terminal unit over said communication medium;

third circuit means responsive to a receive signal from said other terminal unit to key said transmitter to transmit an echo signal to said other terminal unit over said communication medium; and fourth circuit means governed by said first signal sustained beyond said reception time interval to generate a signal for operating said interrupting means, said operating signal generation being blocked in response to a received signal of said terminal unit.

2. A system in accordance with claim 1 wherein each terminal unit includes fifth circuit means governed by the first signal sustained beyond the reception time interval and a receive signal which has not been echo-keyed to inhibit the transmitter from transmitting a signal over said communication medium.

3. A system in accordance with claim 1 wherein each terminal unit includes sixth circuit means governed by said second fault signal to supervise the conduction of a received signal from the receiver to other specified circuit means.

4. A system in accordance with claim 1 wherein the third circuit means of each terminal unit includes means to block the keying of the transmitters under the conditions including the generation of the first signal and the operation of the interrupting means.

5. A system in accordance with claim 4 wherein each terminal unit include seventh circuit means governed by the third circuit means to lock in the keying of the transmitter if the third circuit keying condition is maintained for a first predetermined time interval.

6. A system in accordance with claim 5 wherein each seventh circuit means is governed, when the corresponding third circuit means is not in a keying condition, by the first fault signal and a receive signal to lock in the keying of the transmitter if said first fault signal and receive signal are maintained for the first predetermined time interval.

7. A system in accordance with claim 5 wherein each seventh circuit means includes circuit means for releasing the seventh circuit means from its lock-in condition upon the loss of a received signal.

8. A system in accordance with claim 5 wherein each seventh circuit means includes circuit means for delayed releasing the seventh circuit means from its lock-in condition upon the generation of the first fault signal during said lock-in condition.

9. A system in accordance with claim 5 wherein each seventh circuit means includes a first timer circuit for self-releasing the seventh circuit means from its lock-in condition after the lock-in condition has been maintained for a selected predetermined time interval.

10. A system in accordance with claim 1 wherein each terminal unit includes a second timer circuit governed by the operating signal of the fourth circuit means to control signal transmission by the transmitter.

11. A system in accordance with claim 10 wherein each second timer circuit includes a circuit responsive to the generation of the operating signal to inhibit the signal transmission and responsive to the loss of the operating signal to permit signal transmission after a predetermined time interval.

12. An echo-keyed directional comparison blocking system protecting an electrical power transmission path against internal faults, said transmission path including means for interrupting current at each end thereof, said system including a terminal unit disposed at each end of said transmission path for measuring characteristics representative of the power at its corresponding end of said path and for activating its corresponding interrupting means when an internal fault of the transmission path is detected, each terminal unit including a transmitter, and a receiver for communicating transmit and receive signals with each other through a communication medium, each receiver adapted to receive signals from the transmitters of the terminal units over said communication medium, each terminal unit comprising:

relay means coupled to said transmission path at its corresponding end for detecting a fault condition and generating a fault signal representative thereof;

first circuit means governed by said fault signal to key said transmitter for a reception time interval to transmit an initial signal to said other terminal unit over said communication medium;

second circuit means responsive to a receive signal from said other terminal unit to key said transmitter to transmit an echo signal to said other terminal unit over said communication medium;

third circuit means governed by said fault signal sustained beyond said reception time interval and a receive signal which has not been echo-keyed to inhibit the transmitter from transmitting a signal over said communication medium; and fourth circuit means governed by said fault signal standard beyond said reception time interval to generate a signal for operating said interrupting means, said operating signal generation being blocked in response to a receive signal of said terminal unit.

13. An echo-keyed directional comparison blocking system protecting an electrical power transmission path against internal faults, said transmission path including means for interrupting current at each end thereof, said system including a terminal unit disposed at each end of said transmission path for measuring characteristics representative of the power at its corresponding end of said path and for activating its corresponding interrupting means when an internal fault of the transmission path is detected, each terminal unit including a transmitter, and a receiver for communicating transmit and receive signals with each other through a communication medium, each receiver adapted to receive signals from the transmitters of the terminal units over said communication medium, each terminal unit comprising:

relay means coupled to said transmission path at its corresponding end for detecting a fault condition and generating a fault signal representative thereof;

first circuit means governed by said fault signal to key said transmitter for a reception time interval to transmit an initial signal to said other terminal unit over said communication medium;

second circuit means governed by said fault signal to supervise the conduction of a receive signal from said receiver to other specified circuit means of said terminal unit;

third circuit means responsive to a supervised receive signal from said other terminal unit to key said transmitter to transmit an echo signal to said other terminal unit over said communication medium; and fourth circuit means governed by said first signal sustained beyond said reception time interval to generate a signal for operating said interrupting means, said operating signal generation being blocked in response to a receive signal of said terminal unit.

14. An echo-keyed directional comparison blocking system protecting an electrical power transmission path against internal faults, said transmission path including means for interrupting current at each end thereof, said system including a terminal unit disposed at each end of said transmission path for measuring characteristics representative of the power at its corresponding end of path and for activating its corresponding interrupting means when an internal fault of the transmission path is detected, each terminal unit including a transmitter, and a receiver for communicating transmit and receive signals with each other through a communication medium, each receiver adapted to receive signals from the transmitters of the terminal units over said communication medium, each terminal unit comprising:

relay means coupled to said transmission path at its corresponding end for detecting a fault condition and generating a fault signal representative thereof;

first circuit means governed by said fault signal to key said transmitter for a reception time interval to transmit an initial signal to said other terminal unit over said communication medium;

second circuit means responsive to a receive signal from said other terminal unit to key said transmitter to transmit an echo signal to said other terminal unit over said communication medium, said second circuit means including means to block the keying of said transmitter under the conditions including the generation of said fault signal and the operation of the interrupting means;

third circuit means governed by said second circuit means to lock in the keying of the transmitter if the second circuit keying condition is maintained for a first predetermined time interval; and fourth circuit means governed by said fault signal sustained beyond said reception time interval to generate a signal for operating said interrupting means, said operating signal generation being blocked in response to a receive signal of said terminal unit.

15. A system in according with claim 14 wherein each third circuit means is governed, when the corresponding second circuit means is not in a keying condition, by the fault signal and a receive signal to lock in the keying of the transmitter if said fault signal and receive signal are maintained for the first predetermined time interval.

16. A system in accordance with claim 14 wherein each third circuit means includes circuit means for releasing the third circuit means from its lock-in condition upon the loss of a receive signal.

17. A system in accordance with claim 14 wherein each third circuit means includes circuit means for delayed releasing the third circuit means from its lock-in condition upon the generation of the fault signal during said lock-in condition.

18. A system in according with claim 14 wherein each third circuit means includes a first timer circuit for self-releasing the third circuit means from its lock-in condition after the lock-in condition has been maintained for a selected predetermined time interval.

* * * * *